US006743109B2

(12) United States Patent
Kammerer, Jr. et al.

(10) Patent No.: US 6,743,109 B2
(45) Date of Patent: Jun. 1, 2004

(54) DECORATIVE BOWLING BALL AND METHOD THEREFOR

(75) Inventors: Ronald Kammerer, Jr., Broomfield, CO (US); Stephen Spurgeon, Boulder, CO (US)

(73) Assignee: Brunswick Bowling & Billards Corporation, Muskegon, MI (US)

( * ) Notice: Subject to any disclaimer, the term of this patent is extended or adjusted under 35 U.S.C. 154(b) by 0 days.

(21) Appl. No.: 10/114,381

(22) Filed: Apr. 1, 2002

(65) Prior Publication Data

US 2002/0103034 A1 Aug. 1, 2002

Related U.S. Application Data

(63) Continuation-in-part of application No. 09/596,879, filed on Jun. 19, 2000, now abandoned, and a continuation-in-part of application No. 09/546,216, filed on Apr. 10, 2000.

(60) Provisional application No. 60/338,973, filed on Dec. 7, 2001.

(51) Int. Cl.[7] .............................. B44C 1/17; B44C 1/24; B41M 3/12; B32B 31/12; A63B 45/02

(52) U.S. Cl. ....................... 473/125; 156/230; 156/240; 156/247; 156/272.2; 156/277; 427/148; 428/914; 264/132; 264/313

(58) Field of Search ................................ 473/125, 126; 273/DIG. 20, DIG. 8, DIG. 9; 156/384, 229, 230, 247, 240, 272.2, 277, 289, 540, 542, 580, 581, 583.1; 427/146, 147, 148; 428/914

(56) References Cited

U.S. PATENT DOCUMENTS 4,668,239 A 5/1987 Durand
4,670,084 A 6/1987 Durand
4,873,643 A 10/1989 Powell et al.
4,875,410 A 10/1989 Lee et al.
5,098,096 A 3/1992 Gentiluomo
5,170,704 A * 12/1992 Warren et al. ................ 101/41
5,246,518 A 9/1993 Hale
5,248,363 A 9/1993 Hale
5,302,223 A 4/1994 Hale
5,308,426 A 5/1994 Claveau
5,382,313 A * 1/1995 Eminger ................. 156/583.1
5,431,501 A 7/1995 Hale et al.
5,452,112 A 9/1995 Wan et al.
5,487,614 A 1/1996 Hale
5,488,907 A 2/1996 Xu et al.
5,522,317 A 6/1996 Hale et al.
5,522,774 A 6/1996 Cardinale et al.
5,555,813 A 9/1996 Hale et al.
5,568,805 A 10/1996 Nitta et al.

(List continued on next page.)

FOREIGN PATENT DOCUMENTS

WO WO 99/48969 11/1999

*Primary Examiner*—William M. Pierce
(74) *Attorney, Agent, or Firm*—Dykema Gossett PLLC; Jerome R. Drouillard

(57) ABSTRACT

A method and apparatus is disclosed for transferring a decorative image to a bowling ball by sublimation from a transfer sheet. The method includes applying at least one transfer sheet containing sublimation inks representing a decoration, such as an image or graphic, to the outer surface of the bowling ball and transferring the decoration from the transfer sheet to the bowling ball by applying sufficient heat and pressure to sublimate the inks. A heat press apparatus is one exemplary apparatus that is contemplated for providing the heat and pressure. The heat and pressure may be maintained after sublimation to allow the inks to penetrate beneath the outer surface of the bowling ball. This allows decorating the bowling ball with a durable image or graphic that does not does not affect the performance of the bowling ball. The decoration may cover the entire bowling ball, or any portion thereof.

7 Claims, 4 Drawing Sheets

U.S. PATENT DOCUMENTS 5,584,961 A * 12/1996 Ellsworth et al. ........... 156/481
5,590,600 A 1/1997 Hale et al.
5,601,023 A 2/1997 Hale et al.
5,640,180 A 6/1997 Hale et al.
5,642,141 A 6/1997 Hale et al.
5,644,988 A 7/1997 Xu et al.
5,734,396 A 3/1998 Hale et al.
5,746,816 A 5/1998 Xu
5,798,017 A 8/1998 Claveau
5,830,263 A 11/1998 Hale et al.
5,832,819 A 11/1998 Widman
5,851,331 A 12/1998 Grenetier et al.
5,893,964 A 4/1999 Claveau
5,944,931 A 8/1999 Cranford
5,962,368 A 10/1999 Poole
6,004,900 A 12/1999 O'Brien
6,024,650 A 2/2000 Reeves
6,035,777 A 3/2000 King
6,096,475 A 8/2000 Hare et al.

* cited by examiner

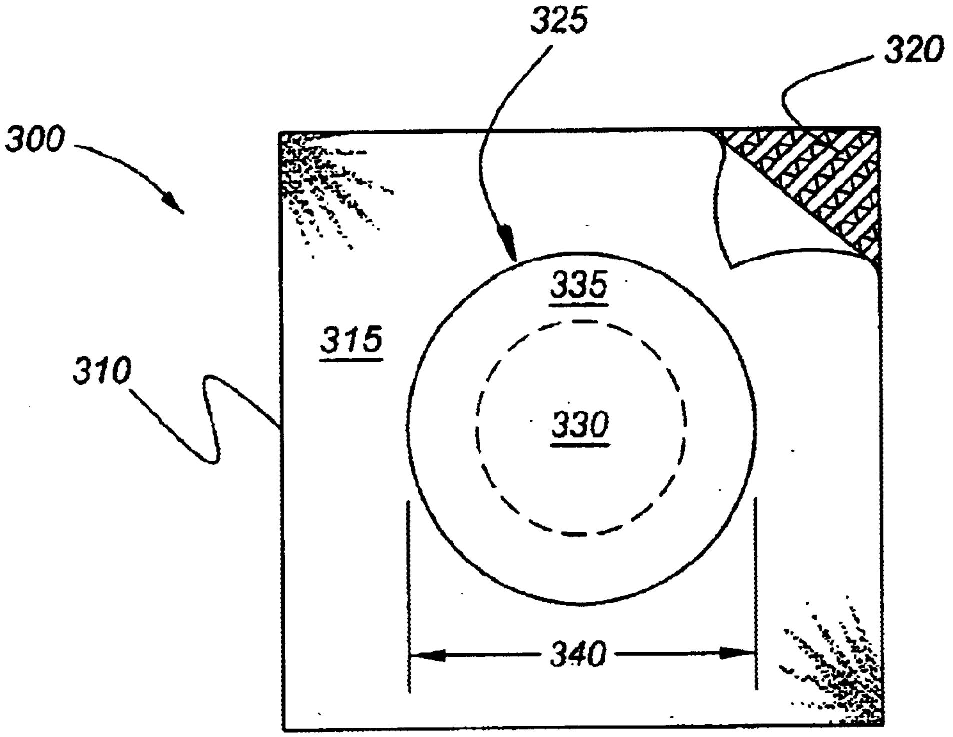
Figure 3
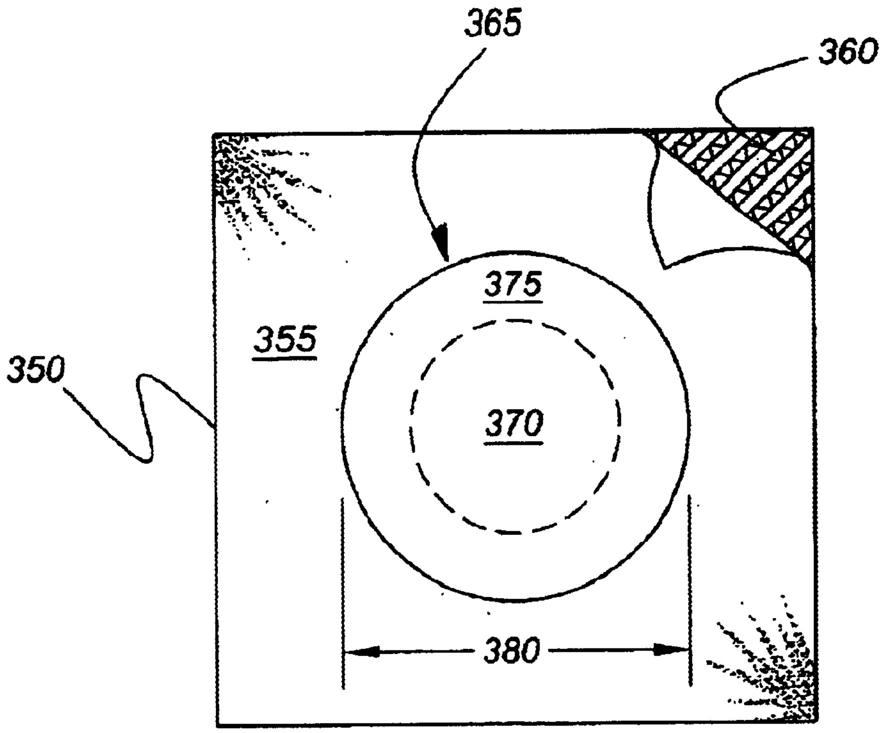

DECORATIVE BOWLING BALL AND METHOD THEREFOR

RELATED APPLICATIONS

The present patent application is a Continuation-In-Part patent application that claims priority to the following co-pending applications: U.S. Provisional Patent Application No. 60/338,973 filed on Dec. 7, 2001, U.S. patent application Ser. No. 09/596,879 filed Jun. 19, 2000, now abandoned, and U.S. patent application Ser. No. 09/546,216 filed Apr. 10, 2000. Patent application Ser. No. 09/596,879 is itself a Continuation-In-Part of patent application Ser. No. 09/546,216.

BACKGROUND

1. Field

The invention relates generally to bowling balls. More specifically, the invention relates to a method and apparatus for transferring a decoration such as an image to a bowling ball by using sublimation, and to a bowling ball having the decoration.

2. Background Information

Bowling is an old and popular game enjoyed by millions of people around the world. According to the rules of bowling, a bowler rolls a bowling ball down a lane towards ten pins arranged in a triangular pattern in order to knock down some or desirably all of the pins. The bowler may keep a score by recording the number of pins knocked-down over a series of frames.

In the field of manufacturing and selling bowling balls, it has been known for many years that the visual appearance of a bowling ball strongly affects how well it will sell. Accordingly, it is not surprising that several prior art approaches for decorating bowing balls have been proposed over the years.

One approach involves directly stamping an ink decoration on the outer surface of the bowling ball. A disadvantage of this approach is that the decoration so applied is not durable and quickly wears away due to abrasion with the lane and other surfaces.

Another approach involves engraving a patterned void in the bowling ball and then filling the patterned void with a differently colored material. For example, the text "Ron" may be engraved in a solid black bowling ball, and then a white resinous material may be poured into the engraved void, hardened, and polished so that the bowling ball remains spherical and smooth. This approach is complicated, expensive, and time consuming, making this approach limited in practice to very simple, primarily one-color, graphics.

A third approach involves grafting a thin polymeric coating constituting a decoration on the outer surface of a bowing ball, as discussed in U.S. Pat. No. 4,875,410 entitled *Decorating Bowling Balls* to Lee et al. One significant disadvantage of this approach is that the coating is applied to the outer surface of the bowling ball and may affect the performance of the bowling ball as it is rolled down the lane. For example, the coating may cause the ball to hook differently, which can affect the trajectory of the ball as it strikes the pins, and ultimately change the number of pins that are knocked-down.

Accordingly, there is a need for an improved method and apparatus for decorating a bowling ball.

BRIEF DESCRIPTION OF THE DRAWINGS

FIG. 3 shows a set of transfer sheets that may be used to transfer decorations to different portions of a bowling ball, according to one embodiment of the present invention.

DETAILED DESCRIPTION

Described herein are a method and apparatus for decorating a bowling ball with sublimation inks. In the following description, for the purpose of explanation, numerous specific details are set forth in order to provide a thorough understanding of the present invention. It will be apparent, however, to one skilled in the art that the present invention may be practiced without some of these specific details. For example, it will be apparent that the particular apparatus described herein may be replaced with other apparatus that are sufficient to provide heat and pressure to transfer a decoration to a bowling ball by sublimation. It will also be apparent that different sublimation inks and bowling ball materials may be used, and that these different materials may offset operating conditions such as transfer temperatures, pressures, and times. In other instances, well-known structures and devices are shown in block diagram form.

Decorated Bowling Ball

Figure 1:
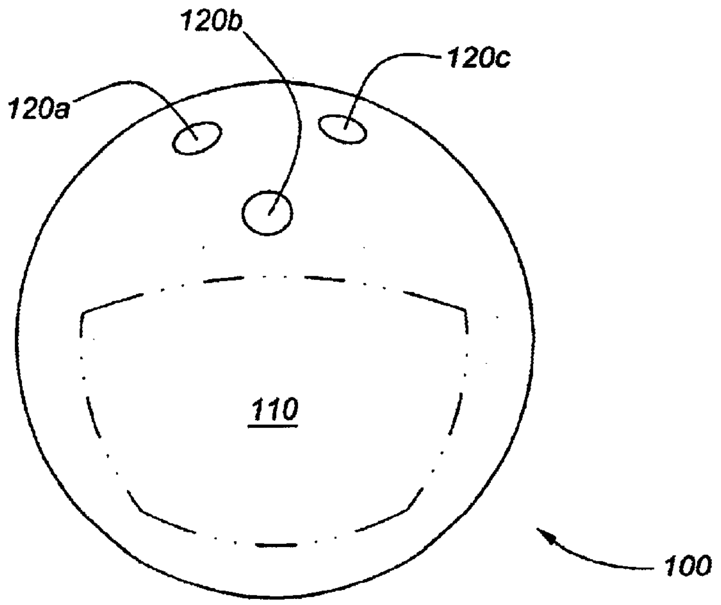
FIG. 1 shows a bowling ball containing a durable decoration created by sublimating inks and allowing them to penetrate beneath the outer surface of the bowling ball, according to one embodiment of the present invention.

FIG. 1 shows a bowling ball 100 containing a durable decoration 110, according to one embodiment of the present invention. The decoration contains sublimation inks that have penetrated into the bowling ball material, beneath the surface, through a process of sublimation from a transfer sheet under the appropriate conditions of temperature and pressure. Since the decoration is formed beneath the surface it is durable and does not alter the performance of the bowling ball.

The bowling ball 100 is a spherical object having size and weight that are sufficient for bowling. For example, the bowling ball may have a circumference ranging from 26.704 inches to 27.002 inches (i.e., a radius ranging from 4.25 inches to 4.30 inches) and a weight that is less than about 16 pounds, as regulated by the American Bowling Congress specifications. However, as will be appreciated by a person having an ordinary level of skill in the art and the benefit of the present disclosure, the size and weight of the bowling ball do not limit the invention.

The bowling ball 100 has a hard, smooth exterior surface that is sufficient for bowling. The surface may be formed of a non-metallic material (by regulation) such as a plastic or resinous material like a hard rubber, polyester, or urethane. At present, many bowling balls are manufactured with either polyester or urethane. The material may have a hardness that is at least about 72 Shore Durometer 'D', in accordance of the guidelines of the American Bowling Congress, or may higher (e.g., between about 78–84D).

It is an aspect of one embodiment of the present invention that the exterior surface of the bowling ball may be substantially colorless, pale, or deficient in color or intensity of color. For example, the exterior surface may be white. It is to be appreciated that it may be difficult to obtain a perfect white, when dealing with real materials used in bowling ball manufacture, and that the term white should be construed as substantially white and should include off-white colors. This may give the bowling ball color neutrality and reduce color conflicts between the colors of the bowling ball exterior surface and the colors associated with the decoration. Advantageously, this may improve the contrasts, highlights, and overall vibrancy of the decoration and make the bowling ball visually appealing and vibrant. Another advantage of the use of substantially white colors is accurate reproduction of trademarked and otherwise highly regulated colors, such as the red used in Coca Cola logos, and may allow incorporating whites such as the white used in Coca Cola logos. The white may also reduce muddying of the portions of the decoration beneath the surface by bowling ball material between the portions and the surface. According to an alternate embodiment of the present invention, both the exterior surface as well as the interior portions of the bowling ball may be colorless in that they are substantially transparent or clear. This may give the decoration a visually appealing semi-transparent quality.

The decoration 110 is to be interpreted broadly as any decoration comprised of inks that have transferred into the bowling ball material, including beneath the surface, after they have sublimated. The inks or dyes, after being sublimated may diffuse or otherwise transfer into the region and thereafter remain as a durable decoration. The penetration depth may depend upon a number of factors including type of ink, type of bowling ball material, and processing conditions such as temperatures, pressures, and times used to transfer the decoration to the bowling ball. In one embodiment of the present invention, the penetration depth is greater than the wear depth incurred over the course of a year by a typical bowler, so that the decoration lasts longer than a year. In this way, after a bowler has used the ball for several months, and incurred a corresponding amount wear due to abrasion, the inks beneath the surface may be exposed so that the image endures and remains vibrant.

The decoration 110 may contain a graphic, pattern, solid color, image, four color image, digital image, photograph, photograph of a person, artwork, company logo, text, name, or any other desired decoration. In one instance, the decoration may contain a four color image, representing a recognizable near photographic quality full color image, and containing virtually any color in the printing spectrum as a combination of four colors such as cyan, magenta, yellow, and black. The decoration may also contain a plurality of distinct spot colors, such as two spot colors, three spot colors, four spot colors, or more than four spot colors.

The present inventors have discovered a method and apparatus for decorating entire bowling balls, or any desired portion thereof. The only limitation to the size of the decoration is the physical size of the ball on which the image is to be applied. Accordingly, it is possible to sublimate a small decoration, such as a spot, or a large decoration, such as a four color image that covers the entire external surface of the bowling ball (e.g., a size between about 227–232 square inches for a regulation sized bowling ball). It is appreciated that the image covering the entire bowling ball may contain certain regions without sublimation inks beneath the surface, such as in a Coca Cola logo incorporating white bowling ball material as white letters. As will be discussed further below, in one embodiment of the present invention, the decoration covering the entire surface of the bowling ball may be formed by concurrently transferring two decorations that each cover about half a regulation bowling ball (i.e., between about 113–116 square inches).

It is appreciated that the bowling ball is shown having finger holes 120A, 120B, and 120C, to accommodate fingers for purposes of holding the bowling ball and delivering it down a bowling lane. However, the holes are not to be regarded as a limitation of the present invention, since the decoration may be transferred to the bowling ball prior to drilling such holes, if they are drilled at all.

Additionally, the bowling ball 100 has been shown and described in simplified format, so as not to obscure the concepts of the present invention. However, a person having an ordinary level of skill in the art of bowling ball manufacture will appreciate that the bowing ball may comprise additional components. For example, often the outer material may form an exterior shell or coverstock having a thickness that is between about a few millimeters and about several centimeters, depending upon the particular bowling ball and choice of materials, which is contiguous with an inner core formed of a different material such as graphite, rubber or urethane. Other components that are contemplated include weights within the inner core to alter the rotational performance of the bowling ball, and other components. The present invention is not limited by the presence or absence of such components.

Horizontal Heat Press Apparatus

Figure 2:
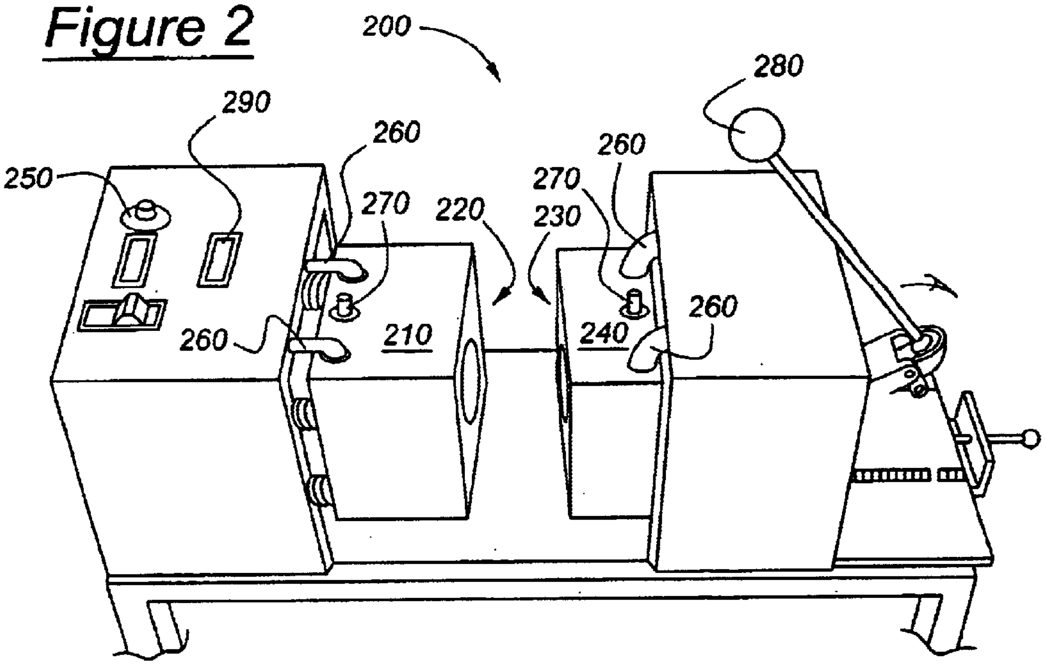
FIG. 2 shows a horizontal heat press apparatus containing two cavities that may be used to provide pressure and heat to a transfer sheet in order to transfer a decoration from the transfer sheet to a bowling ball by sublimation, according to one embodiment of the present invention.

FIG. 2 shows a horizontal heat press apparatus 200 that may be used to transfer a decoration from one or more transfer sheets to a bowling ball by sublimation, according to one embodiment of the present invention. The heat press contains left cavity housing 210 for a left cavity 220, a right cavity housing 240 for a right cavity 230, a heating system to provide heat to transfer sheet positioned against a bowling ball via one or both of the cavities, and a pressurization system to provide pressure to a transfer sheet positioned against a bowling ball by engaging the transfer sheet and the bowling ball with the cavities.

The apparatus 200 provides sufficient heat and pressure to one or more transfer sheets in contact with a bowling ball in order to sublimate inks from the transfer sheets and allow them to transfer to and penetrate into the bowling ball. When the decoration has been transferred, and the inks have penetrated to the desired extent, the heat and pressure may be removed, so that further penetration stops and the decoration is fixed in the desired position and depth.

The pressure has the general effect of keeping the transfer sheet in contact with the bowling ball and directing the sublimation inks to the bowling ball surface. A suitable pressure is one that is sufficient to keep the transfer sheet in contact with the bowling ball outer surface without causing physical damage to the bowling ball. A light to medium pressure between about 10 pounds and about 50 pounds should be sufficient for many implementations. Alternatively, a higher pressure between about 60–80 pounds may be used, as desired. At least some pressure should be provided, desirably uniformly provided, to all portions of the bowling ball that are to receive the decoration, in order to avoid image blurring, or light or dark regions in the image, due to inconsistent pressurized contact. Without at least some suitable pressure, the transfer sheet may be separated from the bowling ball by a gap, which could lead to migration of sublimated inks away from their intended surface location.

The apparatus 200 also provides heat to the transfer sheet and the bowling ball. The heat has the general effect of increasing the temperature of the sublimation inks in the transfer sheet to cause them to sublimate, wherein they pass directly from a solid state to a gas state (without going through a liquid state wherein they might run and corrupt the decoration). The heat also has the effect of increasing the temperature of the bowling ball itself. For most materials, including plastic materials, this leads to softening and improved rates of ink penetration into the material (through for example the diffusion constant). A suitable maximum temperature is one that is greater than the sublimation temperature of the sublimation inks (which may be available from the sublimation ink vendors or measured by using conventional methods) and less than the melting point temperature of the bowling ball outer surface material (which is well known to those skilled in the art of manufacturing bowling balls or which may be measured by using conventional methods).

The extent of penetration depends on both temperature and time. In some implementations it may be desirable to diffuse the sublimation inks a certain distance beneath the bowling ball outer surface to give the decoration durability with respect to bowling ball wear. The temperature may be sufficiently beneath the melting point temperature of the bowling ball outer surface material to keep bowling ball deformation due to softening to a manageable level and sufficiently close to the melting point temperature to achieve good penetration of the sublimation inks beneath the surface. For example, depending upon the resistance to wear of the outer bowling ball material, the expected wear on the bowling ball, and the desired life of the image of the bowling ball, the image may be deposited to a depths ranging between several microns (a micron is one millionth of a meter or about 40 millionth of an inch) to about 0.1 inches. This degree of penetration may be achieved for many different plastic materials, such as polyester and urethane, by operating the apparatus at a temperature between about 220° F. and about 500° F. for a period of time between about 30 seconds and about 30 minutes. There are many suitable combinations of temperature and time that are contemplated within these ranges. Often a higher temperature will be combined with a shorter time, or a lower temperature will be combined with a longer time.

Often, penetration depths greater than just a few microns are desired, in order to make the image more durable. For example, it may be desirable to achieve penetration depths that are between about 0.01 inches and about 0.05 inches, or that are between about 0.03 inches and about 0.04 inches. It will also be appreciated, that shorter periods of time than 30 minutes will frequently be desired in a manufacturing environment, since shorter times allow increased throughput on a fixed set of processing equipment. The present inventors have discovered that, for a material such as polyester and the PYROSCRIPT brand inks, these depths may be achieved with a temperature that is between about 300° F. and about 400° F. maintained over a period of time that is between about 3 minutes and about 15 minutes, as well as with a temperature that is between about 350° F. and about 400° F. maintained for a time that is between about 4 minutes and about 8 minutes. In one particular instance, a temperature of about 360° F. maintained for about 5 minutes may be able to achieve a penetration depth between about 0.01–0.05 inches. Of course, penetration depths that are greater than 0.1 inches may be obtained by using higher temperatures or longer periods of time, although this may lead to image dilution or degradation.

The apparatus 200 uses the heating system and the pressurization system to provide the heat and pressure, respectively, through the cavities 220 and 230. The particular heating system shown contains a dial 250 to set the amount of heating, wires 260 to provide electrical power to heating elements within the cavity housings, the heating elements within the cavity housings (not shown), and temperature sensors 270 (e.g., thermocouples) within the cavity housings to measure temperatures. The housings may contain a thermally conductive material, such as a metal like aluminum, to effectively transfer the heat to the transfer sheet. The pressurization system may include any conventional pressurization system used in mechanical presses. The particular pressurization system shown includes a lever 280 to supply mechanical pressure and a scale 290 to show the mechanical pressure, based on displacement of springs located at the left cavity. Numerous other pressurization systems are also contemplated. For example, the pressurization system may include a hydraulic system, a clamp, a vice, or other known pressurization means.

In this particular apparatus, both the left cavity and the right cavity conform in shape to an outer surface portion of a spherical bowling ball, although this is not required. It is an aspect of one embodiment of the present invention, that the cavities are mating cavities, which are operable to join, come together, couple and contact as they close around and envelop a bowling ball positioned within an interior void formed of the two cavities. The left cavity may conform to an outer surface of a left hemisphere of a bowling ball and the right cavity may conform to an outer surface of an opposing right hemisphere of the bowling ball. For example, each cavity may have a volume that is about half the volume of a regulation-sized bowling ball (e.g., between about 161–167 cubic inches). As desired, resilient heat transmitting pads may be used to compensate for different or varying sizes of bowling balls. The pads may be fixed to the press cavities or may be incorporated into the transfer sheets as an added thin layer of compressible material, often less than about 0.05 inches. Advantageously, the use of such hemispherical mating cavities may be useful to provide substantially uniform heat and pressure to all surface regions of the bowling ball.

Transfer Sheet

As has been discussed previously, at least one transfer sheet containing sublimation inks is placed into intimate contact with the bowling ball in order to transfer the sublimation inks, representing a decoration, from the transfer sheet to the bowling ball. In general, the transfer sheet may include any material or medium sufficient to contain sublimation inks and to release them, through a process of sublimation, under the appropriate conditions.

Although not required, it is an aspect of one embodiment of the present invention that the transfer sheet contain either a flexible material or a stretchable material to improve consistency or uniformity of contact between the transfer sheet and a curved surface of the bowling ball by surrounding the curved surface of the bowling ball. The flexibility and stretchability of the transfer sheet may help reduce folds or wrinkles, which could produce imperfections in the decoration. The transfer sheet may contain a flexible material, a stretchable material, flexible plain paper, a flexible plastic sheet or film, a polyvinyl sheet, a polyester film, a flexible textile, a stretchable textile, a flexible and stretchable textile, a flexible and stretchable spandex textile, a Lycra brand spandex, a polyester spandex blend, or another desired material that is suitable for carrying sublimation inks. The use of such materials may improve the quality of the decorations that are applied to the curved surface of the bowling ball.

Often when decorating significant portions of the bowling ball, it will be desirable to use a flexible and stretchable material. One suitable flexible and stretchable material is a BK3066 textile available from Fisher Textiles of Indian Trail, N.C. This textile contains a blend of about 94% polyester and about 6% Lycra brand spandex in a Jersey Lycra plain knit pattern construction without a distinctive rib (e.g., to avoid imparting fabric patterns). The textile has a weight of about 3.26 ounces per square yard, which is not required so long as there is a sufficiently tight weave (e.g., threads per inch) to avoid significant gaps between the threads when the textile is stretched. The textile has a thickness that is roughly equivalent to that of a commercially available paper towel product. This thickness is not required but may be of assistance in buffering the size variation in regulation bowling balls. The textile has a predetermined amount of stretch along an x-axis of the transfer sheet that is about 82% and a predetermined amount of stretch along a y-axis of the transfer sheet that is also about 82%. Although this much stretch is not required, it will often be desirable to have the amount of stretch be more than about 50% in order to provide good contact with the bowling ball. Desirably, the variance in the amount of stretch should be low. The textile is strong enough to hold the weight of a bowling ball and stretchable enough to stretch under the weight of the bowling ball. The textile has a thermal stability to temperatures of at least about 400° F. The textile may be provided on a removable backing, such as a wax-coated paper, to support the textile during handling and printing. In particular, the backing may provide a rigid or semi-rigid support to reduce stretching during the printing process and to reduce leakage of the sublimation inks. The backing may be removed prior to the sublimation process.

As has been discussed previously, the transfer sheet contains sublimation inks. The term "sublimation ink" will be used broadly to refer to a colored material that is able to sublimate when sufficiently heated. A material sublimates when it passes directly from a solid phase to a gas phase without going through a liquid phase. Dry ice is one well-known material that readily sublimates. Often, the sublimation ink is provided in a vehicle or formulation, such as a solvent, oil, or water, along with other additives such as surfactants or stabilizers. Suitable sublimation inks are commercially available from numerous sources including from Gans Inks of Marietta, Ga. For example, the sublimation inks may be PYROSCRIPT brand sublimation inks, available from Gans Inks. Other suitable sublimation inks are the SubliJet® Ditital Transfer Inks, available from Sawgrass Systems, Inc. of Mount Pleasant, S.C. The sublimation inks may be calibrated with the outer surface color of the bowling ball in order to achieve a desired color, such as Coca-Cola's trademarked red, by well-known color correction approaches.

In one alternate embodiment of the present invention, the sublimation ink may be a fluorescent ink. For example, a decoration may contain ink that fluoresces light in the visible spectrum when exposed to ultraviolet light, such as black light, in a bowling environment. Bowling balls having these inks may be very appealing for use in night bowling, wherein the bowling balls are used in a dark bowling alley and subjected to ultraviolet light. Suitable fluorescent sublimation inks are commercially available from a number of sources. For example, the inks may be the Invisible-Tagent inks available from Gans Inks.

A transfer sheet may be created by loading a blank transfer sheet into a suitable printer and then printing a decoration or image onto the transfer sheet in sublimation inks. The source of the decoration or image, whether it be from a memory, from a CD, from a scanner, from a digital camera, digital image creation software, from the Internet, or from another source is not a limitation of the present invention. The invention is also not limited to the decoration or image being licensed or unlicensed. One suitable printer is an ink jet printer using Epson 3000 head technology, or compatible, which works well with the textile transfer sheets disclosed herein. In one particular instance, the printer is a Mutoh Falcon RJ-4100 ink jet printer. Of course, for large scale printing (e.g., more than 200 transfer sheets), other printers such as offset printers may be desired. It is also contemplated that a manufacturer of decorated bowling balls may purchase or otherwise acquire printed transfer sheets from a printer or other vendor.

Depending upon the particular implementation, the image may be processed to modify the color of the image, the size of the image, to distort the image in a predetermined way, to add or remove details to/from the image, to make corrections to the image, to match colors of the image with sublimation ink colors, or for other reasons. The image may be compressed or distorted so that the image actually printed onto a stretchable transfer sheet accommodates for the amount of stretch in the transfer sheet so that the transferred image has the desired dimensions and appearance. As an example, assuming a nearly equal amount of stretch in different directions along a transfer sheet, an image may be compressed so that it has uncompressed and undistorted dimensions and appearance after the transfer sheet is stretched around a portion of the bowling ball according to the predetermined amount of stretch around the bowling ball. The compressed image may be radially compressed wherein the amount of compression depends at least slightly on the distance from the center, although this is not required. After any desired processing, the decoration may be converted into printer signals and printed as sublimation inks onto the transfer sheet by the printer.

Set of Transfer Sheets

FIG. 3 shows a set 300 of a first transfer sheet 310 and a second transfer sheet 350 that may be used to transfer decorations or images to different portions of a bowling ball, according to one embodiment of the present invention. For example, the first transfer sheet may be used to transfer an image to a first half of the bowling ball and the second transfer sheet may be used to transfer an image to the other half of the bowling ball, so that the two transfer sheets allow forming an image around the entire bowling ball with no significant gap between coverage at the equator. The set of transfer sheets may simplify and improve uniformity of coverage of large surface areas of the bowling ball without wrinkling and folding, since each transfer sheet may accommodate less total spherical area and curvature.

The first transfer sheet 310 contains a stretchable textile 315, such as the flexible, stretchable, polyester Lycra brand spandex blend textile available from Fisher Textiles, on a removable paper backing 320. The stretchable textile may allow the transfer sheet to be stretched substantially uniformly around about half the outer surface of a bowling ball without significant folding or wrinkling of the textile material. This may provide good contact between the textile material and the outer surface of the bowling ball, which may improve transfer of images contained within the textile material.

The stretchable textile 315 contains an image 325 formed of sublimation inks embedded within the textile material.

The image 325 is a representation of an image to be transferred to a bowling ball and may appear differently. For example, text in the image 325 may be a mirror image of text to appear on the bowling ball. Other images formed on the transfer sheet discussed herein are similarly to be regarded as representations of images to be formed on the bowling ball.

The image 325 may be a circular region that contains sublimation inks. The circular region has a diameter 340. The circular region may have an area, or at least a stretched area, that is larger than an area for an outer surface of a hemisphere of a bowling ball. For example, the diameter may be larger than about 10 inches, so that an area of the circular region, when stretched according to the stretch of the textile, is sufficient to cover about half the surface area of a bowling ball.

The particular image 325 at least conceptually contains a center region 330 and a periphery region 335 surrounding the center region. The center region may contain highly patterned or symmetrical portions, photo quality images, images of people, and the like. For example, the center region may contain a photographic image of a person. Often, the center region is sized between about 3×3 square inches and about 6×6 square inches when stretched to cover a bowling ball. The periphery region may contain random patterned imagery, background imagery, camouflage, and the like. For example, a photo quality image of a person may be substantially centered within the center region and geometrically amorphous, random, or pseudo-random background may be used in the periphery region so that the photo quality image may be transferred by the single transfer sheet and so that it is comparatively easy to match up the background of one transfer sheet with the adjacent background provided by another transfer sheet without a significant and unappealing seam. Advantageously, this may allow forming a sophisticated image on one half of the bowling ball with the first transfer sheet and forming another sophisticated image on the opposite half of the bowling ball with the second transfer sheet set against a sufficiently random background that is easily matched up at the equator to avoid a visible seam.

The transfer sheet 310 may contain extra textile that surrounds the image 325. The extra textile material may facilitate handling of the transfer sheet. For example the textile material may be attached to a circular frame having an inner diameter that is larger than a diameter of a bowling ball and through which the bowling ball may pass to stretch the textile material around the bowling ball outer surface. The frame may be centered about the image. Typically the transfer sheet will be attached taught but typically un-stretched to the frame, so that the transfer sheet does not have wrinkles.

Often, the second transfer sheet 350 will have characteristics that are very similar to those of the first transfer sheet 310, with the possible exception of the image 365 being different than the image 325, although this is not required.

Vertical Heat Press Apparatus

Figure 4:
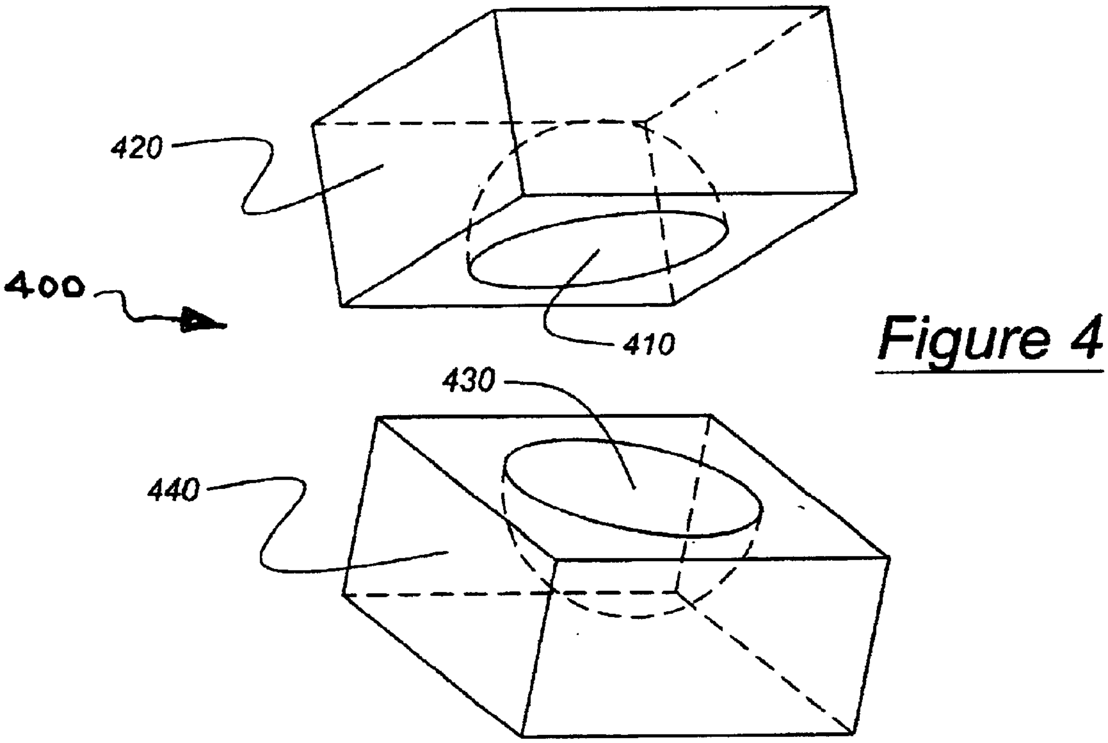
FIG. 4 shows a vertical heat press apparatus containing two cavities that may be used to provide pressure and heat to a transfer sheet in order to transfer a decoration to a bowling ball by sublimation, according to one embodiment of the present invention.

FIG. 4 shows a vertical heat press apparatus 400 containing an upper cavity 410 within a housing 420 and a lower cavity 430 within a housing 440, according to one embodiment of the present invention. The apparatus may contain a heating system and a pressurization system, such as those described for the apparatus 200 shown in FIG. 2 to provide heat and pressure to a transfer sheet and a bowling ball via the cavities. The vertical alignment of the cavities may have the advantage that it is easy to load a bowling ball into the apparatus by placing the bowling ball on a transfer sheet above the lower cavity and allowing the bowling ball to stretch the transfer sheet as it settles into the lower cavity by gravity, as will be discussed further below.

Figure 5:
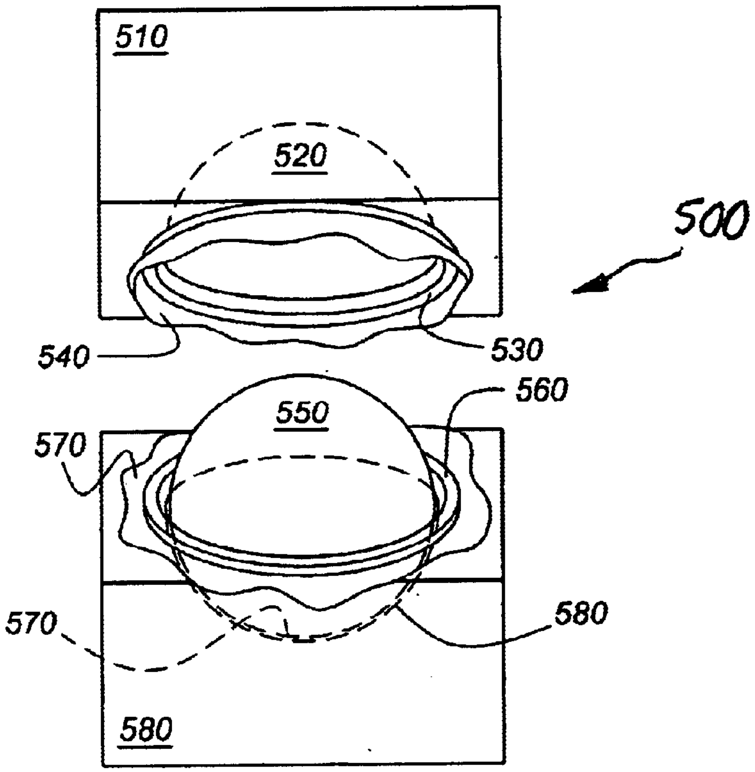
FIG. 5 shows a vertical heat press apparatus configured with a set of transfer sheets and a bowling ball, according to one embodiment of the present invention.

FIG. 5 shows a vertical heat press apparatus 500 configured with a first transfer sheet 540, a second transfer sheet 570, and a sufficiently colorless white bowling ball 550, according to one embodiment of the present invention.

The first transfer sheet 540 is placed in a circular frame 530 having an inner diameter larger than a diameter of the bowling ball and attached to an upper cavity housing 510 so that the inner diameter of the frame allows access to an upper cavity 520 formed in the housing. Likewise, the second transfer sheet 570 is placed in a circular frame 560 having an inner diameter larger than a diameter of the bowling ball and attached to a lower cavity housing 590 so that the frame allows access to a lower cavity 580.

The bowling ball is moved above the second transfer sheet in the region between the upper cavity and the lower cavity, centered above the lower cavity, placed on the lower transfer sheet, and allowed to settle by its own weight. As the bowling ball settles, it begins to stretch the second transfer sheet into contact with a larger portion of the surface of the lower half of the bowling ball. The transfer sheet may be strong enough to support the weight of the bowling ball. Depending upon how stretchable the transfer sheet and the weight of the bowling ball, the bowling ball may settle entirely into the lower cavity, as shown. Of course, additional pressure from the upper cavity may be used to sink the ball entirely into the lower cavity.

After the bowling ball has settled, the upper cavity comes downward so that the first transfer sheet contacts the bowling ball and begins to stretch around the bowling ball as the frame is moved downward. The upper hemisphere of the bowling ball enters the upper cavity. The upper cavity and the lower cavity may mate so that sublimation ink containing portions of the first and second transfer sheets contact substantially all portions of the outer surface of the bowling ball.

After both transfer sheets have been properly positioned against the bowling ball, the apparatus may provide a sufficient amount of heat and pressure for a sufficient amount of time to sublimate sublimation inks within the transfer sheets so that they transfer to the outer surface of the bowling ball and penetrate beneath the surface. The effective values may depend upon the particular sublimation ink used, the material of construction of the bowling ball and the other factor.

In essence, upper transfer sheet 540 and lower transfer sheet 570 are positioned into contact with bowling ball 550 by a multistep process. Contact is initiated in the first case by hoop stress created within the transfer sheets when the ball 550 is first placed on and supported by the first or lower transfer sheet 570, which is supported upon cavity housing 590 by frame 560. This contact is enlarged when upper transfer sheet 540 is pressed into contact with the undecorated bowling ball by moving housing 510 and upper cavity 520 into a closed position with respect to lower cavity 580, which creates hoop stresses in second transfer sheet 540. To reiterate, the transfer sheets are pressed into contact with the surface of the undecorated bowling ball by the hoop stresses created in the transfer sheets when the sheets are deformed by the weight and forced positioning of the undecorated bowling ball. Thereafter, the transfer sheets are compressed between the heat press lower and upper cavities 580 and 520 and the previously undecorated bowling ball 550. While undergoing this compression, heat is applied to the transfer sheets and to the bowling ball, through the lower and upper cavities, sufficient to cause sublimation ink carried upon the transfer sheets to sublime into the outer surface of the bowling ball.

After the desired decorations have been transferred to the bowling ball, the heat press cavities may be separated, the bowling ball removed from the cavities, and the bowling ball cooled. Depending upon the amount of heat used to transfer the decoration to the bowling ball, the bowling ball may reach a temperature at which the bowling ball material has softened to an extent that it may be desirable to avoid shape change of the ball when the ball is removed from the heat press and for example set on a hard flat surface. This may be avoided by supporting an increased surface portion of the ball, such as by leaving the ball in the lower hemispherical cavity until a safe temperature and hardness have been achieved. It may also be placed in a heated bath that uses buoyancy to equalize pressure around the bowling ball, etc.

Exemplary Decorated Bowling Balls

Figure 6:
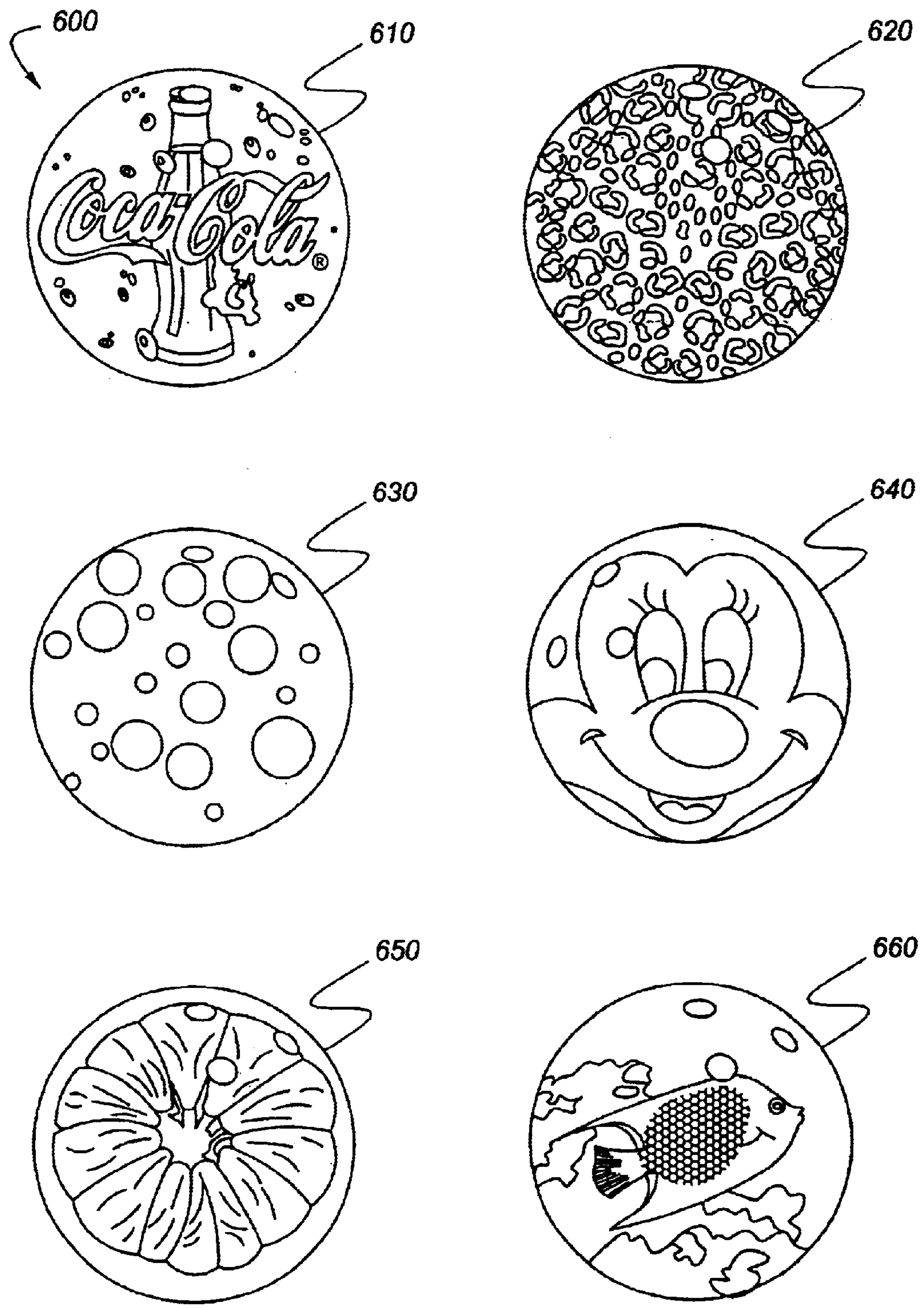
FIG. 6 shows several bowling balls containing exemplary durable four-color, substantially photographic quality images formed beneath the outer surface with sublimation inks, according to one embodiment of the present invention.

FIG. 6 shows several bowling balls 600 each containing a durable four-color image formed of sublimation inks in a subsurface region around the entire surface of the bowling ball, according to one embodiment of the present invention. For convenience, the four-color images are shown in gray scale, although it is to be appreciated that the gray scale may represent virtually any desired color. It is noteworthy that the decorations are surprisingly and disproportionately superior in quality and sophistication compared with any prior art decorations for bowing balls of which the present inventors are aware. It is also noteworthy that the particular decorations are durable decorations that cover the entire surface of the bowling ball, which is also not disclosed in the prior art. Such advances in the art of decorating bowling balls should be construed as even more significant given that the decoration of bowling balls is an old and crowded art.

A first bowling ball 610 contains a Coca-Cola corporate logo, a four-color image of Coca-Cola bottle, and a trademarked Coca-Cola red background. The logo may represent a region that does not contain sublimation inks set against a colorless white bowling ball. The trademarked Coca-Cola red background may contain a spot color adjusted to account for the native color of the bowling ball. A second bowling ball 620 contains a decorative leopard-skin pattern. A third bowling ball 630 contains a decorative Swiss-cheese pattern. A fourth bowling ball 640 contains a photo quality image of a recognizable Disney cartoon character. This bowling ball may help stimulate children's interest in the sport of bowling. A fifth bowling ball 650 contains a photo quality image of a cut orange. A sixth bowling ball 660 contains a photo quality image of a fish tank. Other decorations that are contemplated contain a Warner Brothers Character (e.g., Bugs Bunny), a sports icon (e.g., World Wresting Federation icon Stone Cold Steve Austin), or others.

Recently, bowling balls similar to those shown in FIG. 6 have been marketed as Viz-a-Ball brand bowling balls, available from Brunswick Bowling and Billiards Corporation of Lake Forest, Ill. Not surprisingly, the decorations have been useful in stimulating sales of bowling balls. The Viz-a-Ball brand bowling balls have attained tremendous commercial success as a result of the high quality durable decorative images formed on the balls by sublimation according to an embodiment of the present invention. The brand bowling balls currently account for a significant fraction of all bowling balls sold by Brunswick. The success is due almost entirely to the sublimated decorations.

Alternate Embodiments

The invention is not limited to the particular embodiments discussed above and those having an ordinary level of skill in the art and the benefit of the present disclosure will appreciate that many other embodiments are contemplated and fall within the scope of the claimed inventions.

According to a first alternate embodiment, an apparatus other than a heat press apparatus may be used to provide heat and pressure to sublimate a decoration from a transfer sheet to a bowling ball. In one instance, the pressure may be provided by a membrane, such as a vacuum connected membrane or a heat shrink membrane. The pressure may be provided as the vacuum is engaged or as the membrane is heated and begins to shrink. As desired, the transfer sheet may be incorporated into the heat shrink membrane itself. It is also contemplated that the use of pressure may be avoided altogether, for example with the use of adhesives or other fasteners to intimately contact the transfer sheet with the bowling ball, although the use of pressure will often avoid blurring and irregularities in applied decorations. The heat may also be provided with different apparatus. The heating apparatus may include an oven, a heat lamp, an infrared lamp, a radiant heating unit, a thermal bath, heating coils within the membrane, or by other heating means.

Thus, a method and apparatus for decorating bowling balls with sublimation inks has been disclosed. In the foregoing specification, the invention has been described with reference to specific embodiments thereof. It will however be evident that various modifications and changes may be made thereto without departing from the broader spirit and scope of the invention. The specification and drawings are accordingly to be regarded in an illustrative rather than a restrictive sense.

What is claimed is:

1. A method comprising:

providing a bowling ball having a substantially colorless coverstock formed of a plastic material;

providing one or more flexible, stretchable transfer sheets having a representation of an image printed with sublimation inks on an inner surface thereof for direct application to the colorless coverstock of the bowling ball;

placing a first one of said stretchable transfer sheets in a lower circular frame having an inner diameter larger than the diameter of said bowling ball, with said lower circular frame being attached to a heat press lower cavity sized to envelop the lower half of the surface of said bowling ball;

placing said bowling ball on into said first one of said transfer sheets such that said ball descends at least partially into said heat press lower cavity, with said transfer sheet being pressed into contact with said bowling ball by hoop stresses created within said transfer sheet when said bowling ball is supported by said transfer sheet;

placing a second one of said stretchable transfer sheets in an upper circular frame having an inner diameter larger than the diameter of said bowling ball, with said upper circular frame being attached to a heat press upper cavity sized to envelop the upper half of the surface of said bowling ball;

pressing said second transfer sheet into contact with said bowling ball by moving said upper cavity into a closed position with respect to said lower cavity, so as to create hoop stresses in said second transfer sheet;

compressing said first transfer sheet between said heat press lower cavity and the lower half of the surface of said bowling ball, while simultaneously compressing said second transfer sheet between the heat press upper cavity and the upper half of the surface of said bowling ball; and applying heat to said transfer sheets and to said bowling ball through said lower cavity and said upper cavity sufficient to cause said sublimation ink to sublime onto the outer surface of said bowling ball.

2. The method of claim 1, wherein heat is applied sufficient to heat said transfer sheets to a temperature that is between 300° F. and 400° F. for a period of time that is between 3 minutes and 15 minutes.

3. The method of claim 1, wherein heat is applied sufficient to heat said transfer sheets to a temperature that is between 350° F. and 400° F. for a period of time that is between 4 minutes and 8 minutes.

4. A method according to claim 1, wherein said stretchable transfer sheets comprise a stretchable textile that has a predetermined and substantially uniform amount of stretch in a plurality of stretching directions.

5. A method according to claim 4, wherein the stretchable textile comprises spandex.

6. The apparatus of claim 1:

wherein the transfer sheet comprises a stretchable transfer sheet; and wherein the image comprises a stretchably compressed image.

7. A method according to claim 1, wherein said transfer sheets each comprise a stretchable transfer sheet containing a radially compressed image that is operable to be decompressed by stretch applying the image to the outer surface portion of the bowling ball.

* * * * *